(12) United States Patent
Wong et al.

(10) Patent No.: US 8,700,966 B1
(45) Date of Patent: *Apr. 15, 2014

(54) RESTART OPERATION WITH LOGICAL BLOCKS IN QUEUED COMMANDS

(71) Applicant: Marvell International Ltd., Hamilton (BM)

(72) Inventors: William C. Wong, Cerritos, CA (US); Huy Tu Nguyen, Modjeska Canyon, CA (US); Kha Nguyen, Mission Viejo, CA (US)

(73) Assignee: Marvell International Ltd (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/849,739

(22) Filed: Mar. 25, 2013

Related U.S. Application Data

(63) Continuation of application No. 12/415,207, filed on Mar. 31, 2009, now Pat. No. 8,412,998.

(60) Provisional application No. 61/041,740, filed on Apr. 2, 2008.

(51) Int. Cl.
*G06F 11/00* (2006.01)

(52) U.S. Cl.
USPC ............... 714/748; 714/17; 714/18; 714/749; 714/750

(58) Field of Classification Search
USPC .............................. 714/17, 18, 748, 749, 750
See application file for complete search history.

(56) References Cited

U.S. PATENT DOCUMENTS

| | | | | |
|---|---|---|---|---|
| 5,247,618 A | * | 9/1993 | Davis et al. | 710/21 |
| 5,809,260 A | * | 9/1998 | Bredin | 710/306 |
| 5,941,998 A | * | 8/1999 | Tillson | 714/54 |
| 7,120,737 B1 | * | 10/2006 | Thelin | 711/112 |
| 7,506,235 B2 | * | 3/2009 | Merritt | 714/748 |
| 7,849,259 B1 | * | 12/2010 | Wong et al. | 711/112 |
| 8,156,415 B1 | | 4/2012 | Nguyen et al. | |
| 8,412,998 B1 | * | 4/2013 | Wong et al. | 714/748 |
| 2005/0132040 A1 | * | 6/2005 | Ellis et al. | 709/223 |
| 2006/0107092 A1 | * | 5/2006 | Lum et al. | 714/5 |
| 2008/0133969 A1 | * | 6/2008 | Manoj | 714/20 |
| 2009/0177937 A1 | * | 7/2009 | Lee et al. | 714/748 |

\* cited by examiner

*Primary Examiner* — Joshua Lohn (57) ABSTRACT

Methods and systems associated with re-transferring data that was unsuccessfully transmitted to a host are described. According to one embodiment method includes receiving a first command to transfer data to a host, wherein the data is arranged in blocks. The data is transferred to the host. When an unsuccessful status is received from the host indicating a transmission error occurred for the first command, a block being transferred when the transmission error occurred is identified. The data in the identified block is re-transferred to the host without re-transferring successfully transferred blocks.

20 Claims, 6 Drawing Sheets

RESTART OPERATION WITH LOGICAL BLOCKS IN QUEUED COMMANDS

CROSS-REFERENCE TO RELATED APPLICATIONS

This disclosure is a continuation of U.S. application Ser. No. 12/415,207 filed on Mar. 31, 2009, which claims benefit under 35 USC §119(e) to U.S. provisional application Ser. No. 61/041,740 filed on Apr. 2, 2008, which are both hereby wholly incorporated by reference.

BACKGROUND

In a disk drive environment, command queuing improves performance by sequentially executing many entries in a queue without firmware intervention. Because of the pipelined nature of queued commands, when data from the queued commands is being sent to the host, the queue logic may already be fetching data for the next queue entry. If an error occurs in the transmission, the logic would have to accurately back track and restart from the point where data was last known to have been successfully sent to the host. Such a restart operation is made more difficult when the queued commands refer to the data using logical blocks.

BRIEF SUMMARY

In general, in one aspect this specification discloses a method for re-transferring data that was unsuccessfully transmitted to a host. The method includes receiving a first command to transfer data to a host, wherein the data is arranged in blocks. The data is transferred to the host. When an unsuccessful status is received from the host indicating a transmission error occurred for the first command, a block being transferred when the transmission error occurred is identified. The data in the identified block is re-transferred to the host without re-transferring successfully transferred blocks.

In general, in one aspect this specification discloses a system for re-transferring data that was unsuccessfully transmitted to a host. The system includes a memory that includes a plurality of queues configured to queue a series of commands, including a first command and a second command, that transfer data to a host. The system also includes a transmit first in first out memory (FIFO) for transmitting the data to the host and a disk controller. In response to receiving an unsuccessful status from the host that indicates that a transmission error occurred during transfer of data specified by the first command, the disk controller is configured to: i) identify a block of data being transmitted when the transmission error occurred; and ii) re-transfer the data in the identified block to the host without re-transferring data that was successfully transmitted to the host.

In general, in one aspect this specification discloses a method for re-transferring data that was unsuccessfully transmitted to a host. The method includes moving, from a staging queue to an execution queue, a first command to transfer data arranged in blocks to a host, where the first command specifies a starting block and a number of blocks to be transferred. Data specified by the first command is fetched. The method includes moving the first command to a holding queue and transferring the data to the host. When an error message is received from the host indicating that an error occurred during the transferring of data, the method includes i) identifying a block being transferred when the error occurred, ii) modifying the starting block of the first command to correspond to the identified block to create a modified first command, and iii) moving the modified first command to the staging queue.

DETAILED DESCRIPTION

The present invention relates to performing a restart operation with logical blocks in queued commands for a storage system, such as a disk drive. The following description is presented to enable one of ordinary skill in the art to make and use the invention and is provided in the context of a patent application and its requirements. Various modifications to the embodiments and the generic principles and features described herein can be made. Thus, the present invention is not intended to be limited to the embodiments shown, but is to be accorded the widest scope consistent with the principles and features described herein.

Figure 1:
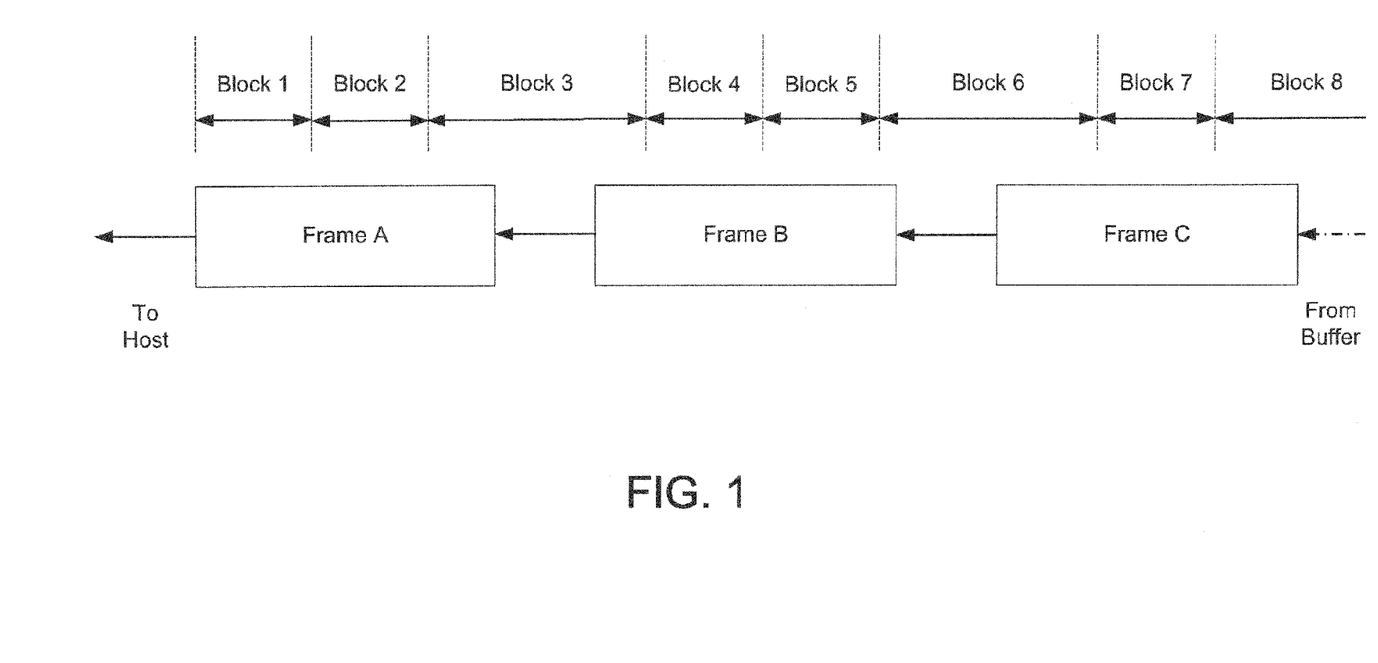
FIG. 1 illustrates an exemplary data stream to be transferred to a host.

FIG. 1 illustrates an exemplary data stream to be transferred to a host. As shown, each command may include a number of data blocks (e.g., blocks 1-8), and each block may contain a number of bytes (e.g., 512 bytes). Data may be transmitted to a host as a series of frames (e.g., frames A, B and C). A frame size may have no correlation to a block size. For example, an FC (Fiber Channel) frame payload may have 0 to 2112 bytes, and an SAS (Serial-Attached Small Computer System Interface) frame payload may have 1 to 1024 bytes. In FIG. 1, as an example, frame A may include blocks 1 and 2 and part of block 3, and frame B may include part of block 3, blocks 4 and 5, and part of block 6. The data stream shown in FIG. 1 may be used for FC or SAS. In some systems, the data that needs to be transferred to the host may be arranged in logical blocks.

Figure 2:
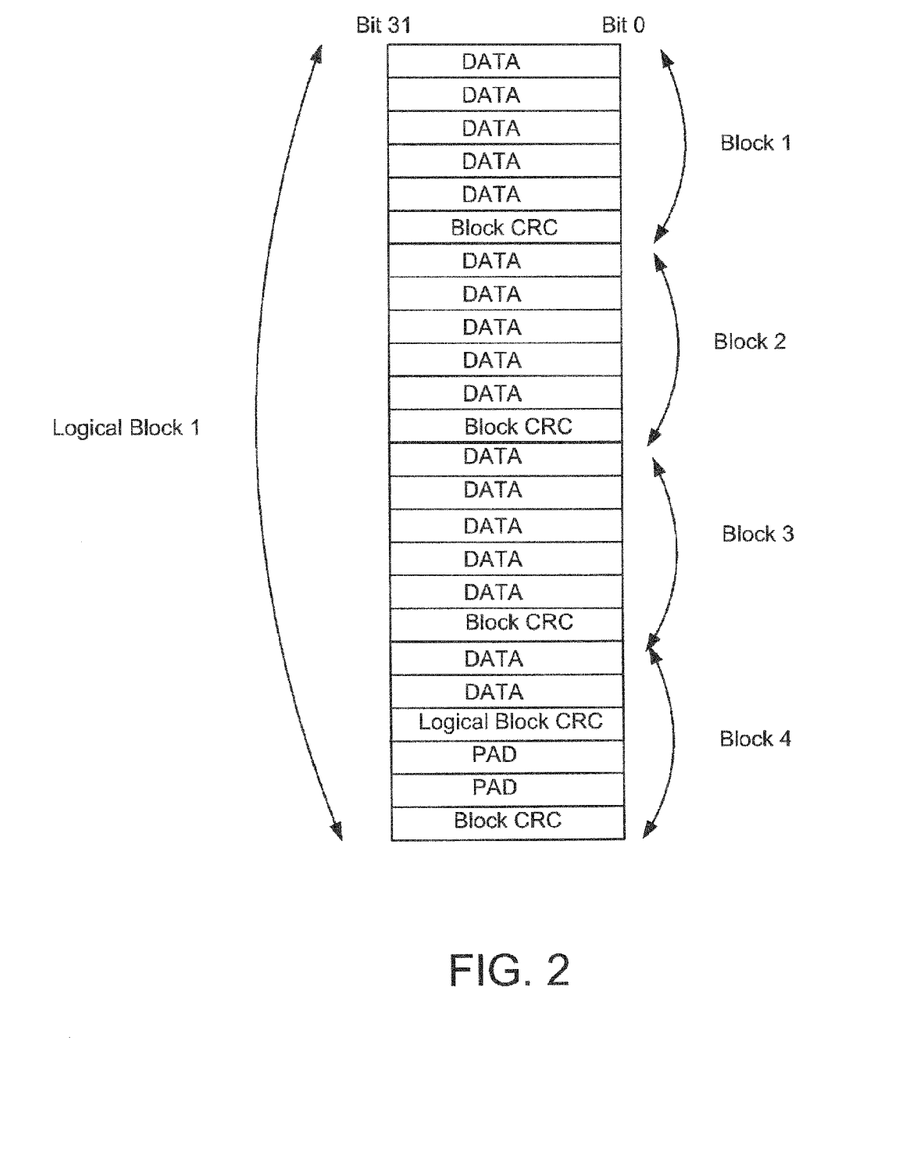
FIG. 2 is a block diagram illustrating the concept of a logical block.

FIG. 2 is a block diagram illustrating the concept of a logical block. A logical block, e.g., logical block 1, may contain one or more blocks up to a maximum of 16 blocks for one logical block. In the example shown, logical block 1 contains blocks 1-4, where all but the last block includes five 32-bit data words and a one-word cyclic redundancy check (CRC), which the host may use to confirm correctness of the data received for the five words in that block.

In some cases, the data for one logical block may not fit exactly into X number of blocks, instead the data may only fit into X−1 blocks, such that only a portion of the last block, e.g., block 4, may contain data words and the remainder of the last block is filled with pad words, which are typically all zeros. The block CRC for the last block covers the data words and the PAD words in the last block. The last block may also contain a logical block CRC that covers all the data words in the logical block, but not the block CRC's. In this example, the logical block CRC covers 17 data words.

There are two parameters that specify the relation between a logical block and blocks. One parameter is a 4-bit logical block to block ratio, where a ratio of four means four blocks comprise one logical block. The other parameter is an end-to-end count which specifies how many PADs come before the block CRC.

Figure 3:
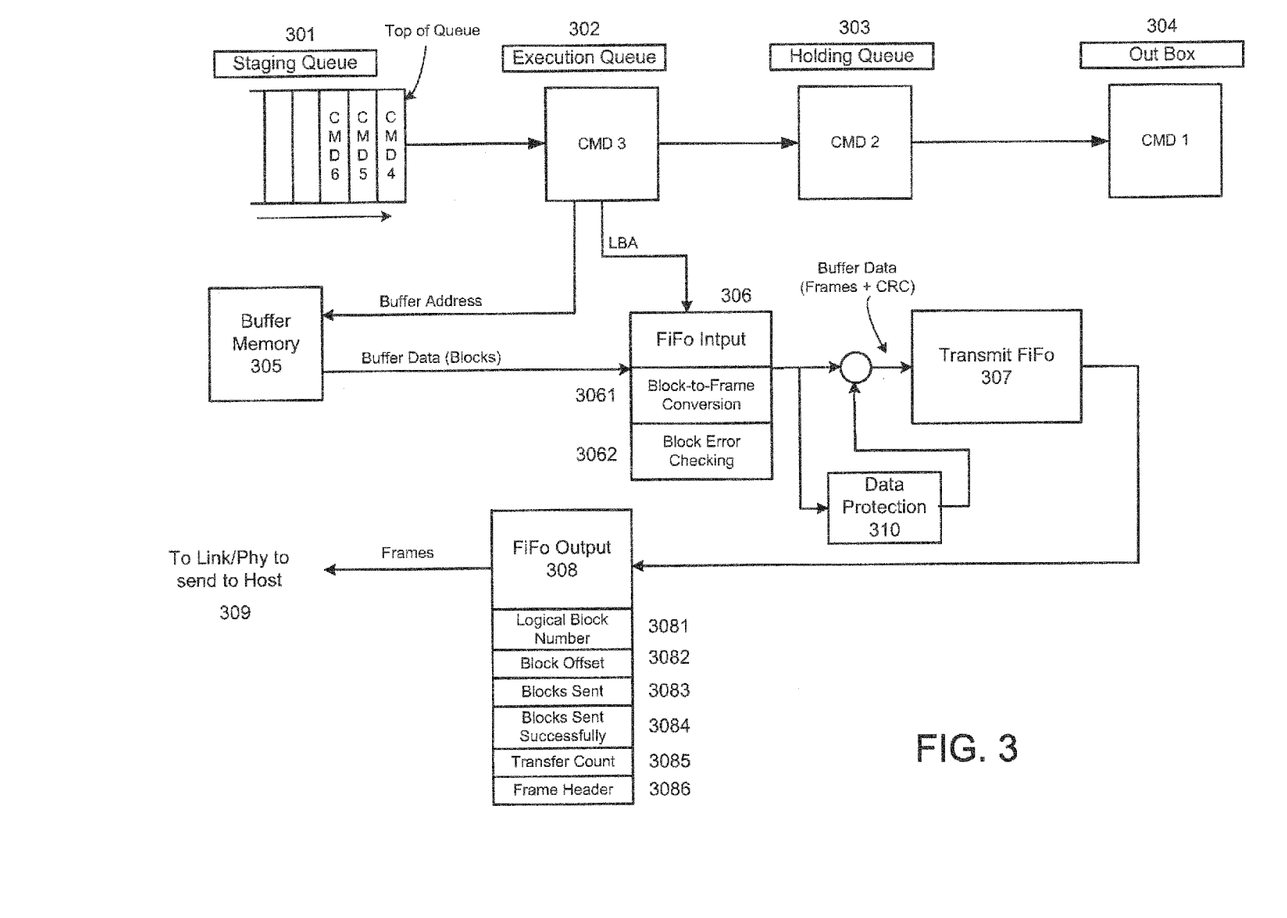
FIG. 3 illustrates a system for command queuing for a disk drive according to one embodiment.

FIG. 3 illustrates a system for command queuing for a storage system, such as a disk drive, according to one embodiment. The command queuing system may include a first memory 301 for a staging queue, a second memory 302 for an execution queue, a third memory 303 for a holding queue, and a fourth memory 304 for an out box. In one embodiment, the memories 301-304 may be FIFOs (First-In-First-Out). The command queuing system may further include a buffer memory 305, a transmit FIFO 307, and a Link/Phy layer 309. In one embodiment, a memory device comprising the transmit FIFO 307 may include a FIFO input 306, a data protection blocked 310 and a FIFO output 308. The transmit FIFO 307 may temporarily store data transmitted between the storage device and the host pursuant to the commands in the queues. In one embodiment, the memories 301-304 and the memory device for the transmit FIFO 307 may be part of the same memory device Firmware executing in a disk controller (not shown) may write to the staging queue a number commands, e.g., commands 1-6. The commands may request data transfer to a host, and are moved between the set of queues using a pipeline approach. The command on top of the staging queue initiates a request for transfer of data stored as logical blocks and the command is moved to the execution queue. Each command specifies a number of blocks of data to be transmitted to the host as a number of frames. For example, one command may specify a transfer of 50 blocks, which when using a logical block ratio of 5, translates into 10 logical blocks. In this example, each logical block includes 5 blocks and the $5^{th}$ block may or might not contain padding.

In one embodiment, each command may specify a starting buffer address, a starting LBA (Logical Block Address), a Skip LBA (number of LBA to skip) and the number of blocks to transfer.

The data to be transmitted to the host may be read from the buffer memory 305 of the disk drive. When a command is being executed, a buffer address of the data blocks to be transmitted may be used to locate the data in the buffer memory 305. The data may be transmitted to the host as frames via the transmit FIFO 307 (which includes a FIFO input 306 and a FIFO output 308) and the Link/Phy layer 309.

A command in the execution queue remains in the execution queue until all blocks of data requested by a command are transferred to the host. While the data from the previous command is being transferred, the next command on top of the staging queue initiates another request for data transfer automatically. Once a command in the execution queue completes execution, the command moves from the execution queue to the holding queue. When a status from the host is received indicating the transfer of all the blocks completed without error, the command may move to the out box 304 and may be deleted.

The FIFO input 306 may receive buffer data from the buffer memory 305, which in one embodiment, may be received in blocks. The FIFO input 306 may have a block-to-frame conversion module 3061 for converting the buffer data from blocks into frames, and a block error checking module 3062 for checking if there is any error in a data block. A data protection module 310 may be used for data integrity check.

In one embodiment, the data protection module 310 may add error check information, such as a CRC (Cyclic Redundancy Check) word, to the data frames output from the FIFO input 306 and input to the transmit FIFO 307. The FIFO output 308 may track information of successfully transmitted data, so that if there is an error in the data transmission, the system may accurately backtrack and restart from the point where data were last known to have been successfully sent to the host.

According to an exemplary embodiment, the FIFO output 308 may maintain the following values during the transmit operation: a Logical Block Number 3081, a Block Offset 3082, a number of Blocks Sent 3083, a number of blocks sent successfully 3084, a number of bytes to transfer represented by Transfer Count 3085, and a Frame Header 3086.

The Logical Block Number 3081 maintains the logical block ratio, which indicates how many blocks are contained in the logical blocks. The number of Blocks Sent 3083 may track the number of blocks sent, but not acknowledged as received error-free at the host. The host may not acknowledge each frame as the frame arrives but may accumulate many frames before sending the acknowledgement. These frames may have their block count accounted for in the Blocks Sent 3083, and when the acknowledgement eventually arrives, the value in Blocks Sent 3083 may be used to update the number of blocks sent successfully 3084. If an error occurs in the transmission since the last acknowledgement, the value in 3083 may be simply discarded.

The number of bytes to transfer in the Transfer Count 3085 may track the amount of data sent to the host. The Transfer Count 3085 may double-check the amount of data gathered from the memory buffer 305 through the FIFO input 306 and the transmit FIFO 307. The Frame Header 3086 may include a Relative Offset/parameter field that identifies where in the whole transfer the data in this frame belongs and may be updated as each byte is sent to the host.

Each new command may initiate the following operations in the FIFO output box 306:

a) The Block Offset 3082 may be set to the block size of data in the command;

b) The number of Blocks Sent 3083 may be cleared to zero;

c) The number of Blocks Sent Successfully 3084 may be cleared to zero;

d) The number of bytes to transfer in the Transfer Count 3085 may be set to the transfer size in bytes; and e) The Relative Offset/Parameter field in the Frame Header 3086 may be set to zero or to an initial value by the firmware for the first command, or may be a continuation of the value from the previous command.

As each word of payload leaves the transmit FIFO 307, the following changes may take place in the FIFO output 308:

a) The Block Offset 3082 may decrement by the amount of data transmitted in a block. Once it reaches zero, it is reloaded with the size of the data block in the command;

b) The number of Blocks Sent 3083 may increment by 1 each time the block offset 3082 counts down to zero;

c) The number of Blocks Sent Successfully 3084 may be updated by the number of blocks sent in a frame which the host has indicated being received error-free;

d) The number of bytes to transfer in the Transfer Count 3085 may decrement by the amount of data transmitted. Once the Transfer Count 3085 reaches zero, all data for the command have been sent; and e) The Relative Offset/Parameter field in the frame header 3086 may increment by the amount of data.

Figure 4:
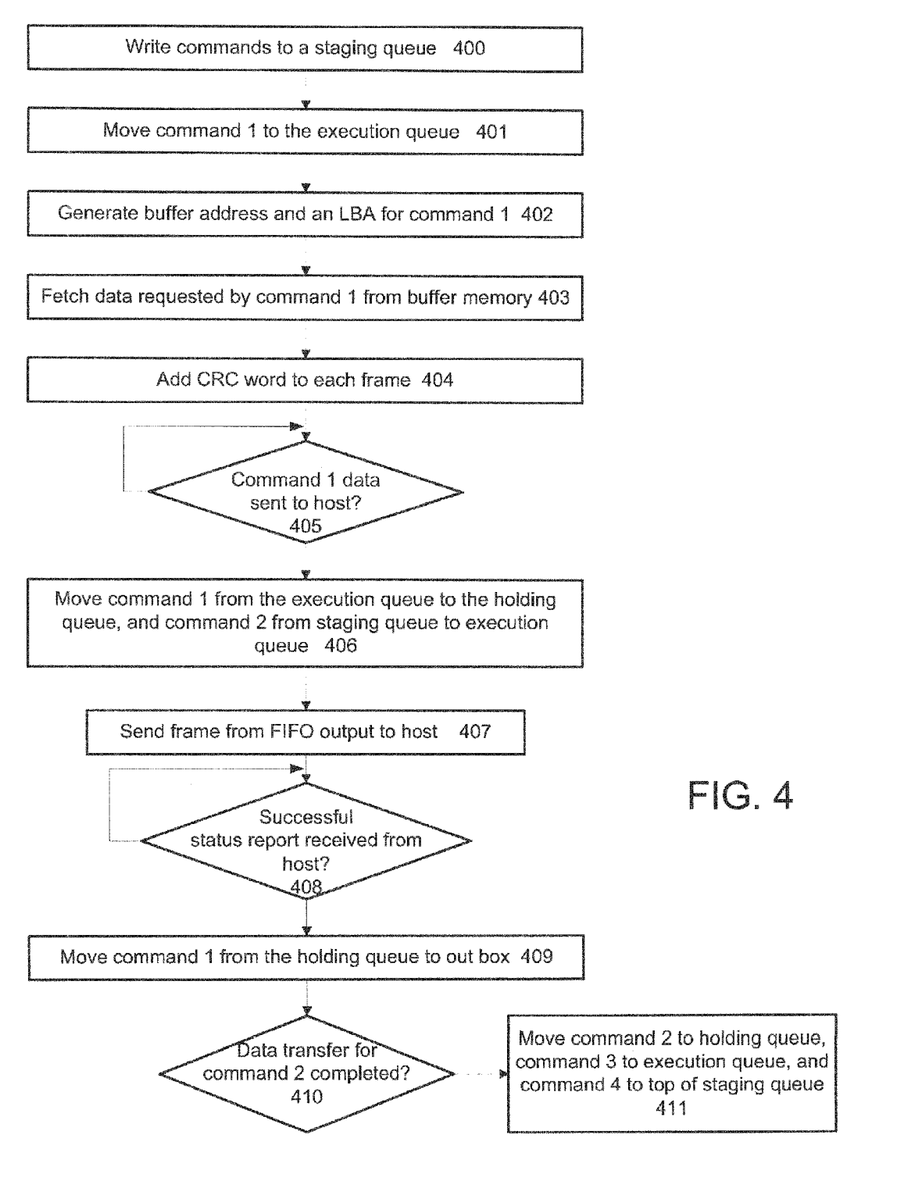
FIG. 4 illustrates a flow diagram of a successful command queuing operation for a disk drive according to one embodiment of the present invention.

FIG. 4 illustrates a flow diagram of a successful command queuing operation for a disk drive according to one embodiment of the present invention. The method may be used in the system shown in FIG. 3.

Firmware may write commands, e.g., commands 1-6, to a staging queue at 400. As stated above, each command may include a starting buffer address, a starting LBA, a Skip LBA, and an integral number of blocks to transfer. A specification for the block size, e.g., in bytes, may be a static value for the whole operation, and might not be a part of the command. The block size and number of blocks may be used to generate the number of bytes to transfer 3085.

At 401, command 1 may bubble up to the front of the staging queue, initiate a request for data transfer and move to the execution queue.

At 402, a buffer address and an LBA may be generated for command 1 based on the following equations:

$$\text{Buffer address} = \text{starting buffer address} + (\text{block size})^* (\text{Skip LBA}) \quad (1)$$

$$\text{LBA} = \text{starting LBA} + \text{Skip LBA} \quad (2)$$

Data to be transferred may be read from a location in the buffer memory 305 pointed to by the buffer address, and the LBA may be used as the seed to check integrity of data coming from the buffer memory 305. The starting buffer address, starting LBA, Skip LBA and number of blocks to transfer may be saved in the execution queue.

At 403, data blocks requested by command 1 may be fetched from the buffer memory 305 and sent to the transmit FIFO 307. The FIFO input 306 may convert incoming data, in blocks, into data in the size of a designated frame payload.

At 404, a CRC word may be added by the data protection module 310 to each frame payload from the FIFO input 406 to aid in error detection.

If all data requested by command 1 have been sent to the transmit FIFO 307 at 405, then command 1 may move from the execution queue in the memory 302 to the holding queue in the memory 303 at 406. Command 1's starting buffer address, starting LBA, Skip LBA and number of blocks to transfer may also move from the execution queue to the holding queue. At the same time, command 2 may move from the staging queue to the execution queue, and data requested by command 2 may start to be fetched.

At 407, at the FIFO output 308, each frame payload of data leaving the FIFO 307 may be preceded by a header and sent to the Link/Phy 309 on its way to the host. The FIFO output 308 may store the logical block to block ratio in the Logical Block Number 3081; track the Block Offset 3082 in a block; track the Number of Blocks Sent 3083; track the number of Blocks Sent Successfully 3084; update the number of bytes to transfer in the Transfer Count 3085; and update the Frame Header 3086 for the next frame.

If a status report is received from the host acknowledging that all data for command 1 have been successfully received at 408, command 1 may move from the holding queue to the out box at 409, where it may be serviced/discarded by the hardware or examined by the firmware.

Meanwhile, if data transfer for command 2 is completed at 410, at 411, command 2 may move to the holding queue, command 3 may move to the execution queue, and command 4 may percolate to the front of the staging queue. FIG. 3 shows the status of the commands at this moment.

The host might not always receive the data correctly, e.g., when a frame is lost or corrupted in transmission. In this scenario, the command queuing operation may have to be suspended and a restart operation may need to begin to transfer the data that were not successfully transmitted.

For instance, in the example shown in FIG. 3, assume that a status report is received from the host indicating an unsuccessful data transfer for command 2, which waits in the holding queue. As an example, assume the host only receives a number of good frames that translates into 10 blocks, which is 2 logical blocks plus a few words (offset) into the next logical block or the 11th block. In this scenario, command 3, which is in the execution queue, has to be suspended and a restart operation needs to begin starting with command 2. The data for command 2 that the host received successfully does not need to be resent, only the data beginning at a certain offset into the $11^{th}$ block.

When the data from the buffer memory 305 is arranged as logical blocks and a restart operation is required, the system must determine in which logical block the error occurred during transmission. The host, however, refers to the data in terms of frame size, which has no relation to block size. The exemplary embodiment determines the logical block in which the error occurred and the block offset in that logical block from which the restart operation may begin resending the data.

Figure 5:
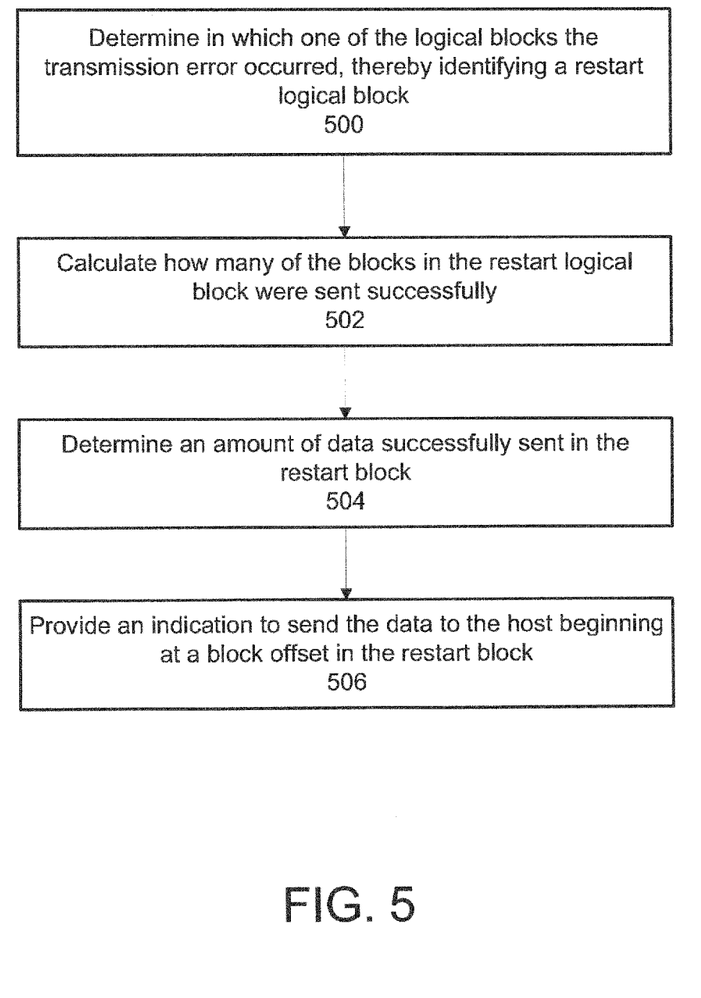
FIG. 5 is a flow diagram illustrating a process for performing a restart operation when an error occurs in a command queuing operation that uses logical blocks according to an exemplary embodiment.

FIG. 5 is a flow diagram illustrating a process for performing a restart operation in a storage device when an error occurs in a command queuing operation that uses logical blocks according to an exemplary embodiment. The process may assume a command queuing operation that may queue commands. In the exemplary embodiment, as described above, the command queuing operation comprises queuing at least a first command and a second command in a first queue, where the commands are for transferring data to a host. Although the data is transferred in frames, the data is initially arranged as logical blocks, each comprising a plurality of blocks. The first command is moved from the first queue to a second queue for execution, while the data requested by the first command are fetched from a buffer memory 305 and sent to the transmit FIFO 307. The first command is moved from the second queue to a third queue after the first command has been executed to wait for the host to return a status report, while the second command is moved from the first queue to the second queue for execution.

Although the command queuing has been described using as many as four queues, in an alternative embodiment, the restart operation may be implemented with a command queuing system that uses as few as two queues. Also, both command queuing and the restart operation may be performed by firmware of disk controller, hardware, or a combination of firmware and hardware. In addition to disk drives, the present embodiment may also be used in other storage devices, e.g., solid-state drives. Accordingly, as used herein, the term "disk drive" includes solid-state drives.

To perform the restart operation successfully, information regarding the logical blocks and the data transmitted successfully during the data transmission may be maintained. In one embodiment, during transmission of the data to the host, values may be maintained for parameters comprising the logical block to block ratio, e.g., the Logical Block Number 3081, the starting logical block address (LBA), the Block Offset 3082, and the number of Blocks Sent Successfully 3084.

At 500, in response to receiving an unsuccessful status from the host indicating a transmission error occurred for the first command, it is determined in which one of the logical blocks the transmission error occurred and from which data needs to be resent, thereby identifying a restart logical block, i.e., the logical block form which the restart operation will begin resending the data. In one embodiment, the logical block ratio and the Blocks Sent Successfully 3084 may be used to determine in which one of the logical blocks the transmission error occurred.

In one embodiment, when the unsuccessful status from a host is received, the staging queue may be reset to begin again with the first and second commands, respectively. In one embodiment, this may be accomplished by pushing content of the staging queue down by a number of commands in the execution queue and the holding queue, and writing at least the first command and the second command back to staging queue. The first command may be written back in the staging queue along with parameters associated with the first command that may be retrieved from the holding queue, included a starting buffer address and a starting logical block address (LBA), and a number of blocks to transfer. The number of Blocks Sent Successfully 3084 and the Block Offset 3082 that are associated with the first command may also be retrieved from the FIFO output 308.

In one embodiment, determining the restart logical block may include regenerating the buffer address and LBA for the first command using the starting block address and the starting LBA per equations (1) and (2). Next, the number of Blocks Sent Successfully 3084 is used to adjust the starting LBA such that the restart operation begins at the beginning of the restart logical block. In one embodiment, the purpose of adjusting the starting LBA such that the blocks are always retrieved from the beginning of the restart logical block is so that the logical block CRC can be computed for the restart logical block. The adjusted starting LBA may be used to seed the data integrity check logic. In one embodiment, the Blocks Sent Successfully 3084 may be used to also adjust the starting buffer address and the number of blocks to send.

At 502, how many of the blocks in the restart logical block were sent successfully is calculated. In one embodiment, the number of Blocks Sent Successfully 3084 and the Logical Block Number 3081 (i.e., the logical block to block ratio) may be used to calculate how many of the blocks in the restart logical block were sent successfully. It may also be determined that the block immediately following the blocks sent successfully is the block in which the transmission error occurred and from which the data needs to be resent, thereby identifying a restart block. Stated differently, the restart block is the point where data was last known to have been successfully sent to the host and the point from which the data will be retransmitted to the host.

At 504, the amount of data successfully sent in the restart block is determined. In one embodiment, the Block Offset 3082 may be used to determine an amount of data successfully sent in the restart block.

At 506, an indication is provided to resend at least a portion of the data in the restart block to the host. In one embodiment, the data transmitted from the beginning of the restart logical block up to the block offset is discarded, but is read along with the resent data to compute the logical block CRC.

In another embodiment, at any time after the parameters are retrieved the execution and staging queues up until prior to the data being resent, the restart operation may further include clearing the transmit FIFO 307 of all data, and setting a restart condition so that the host can differentiate from a normal start operation.

Figure 6:
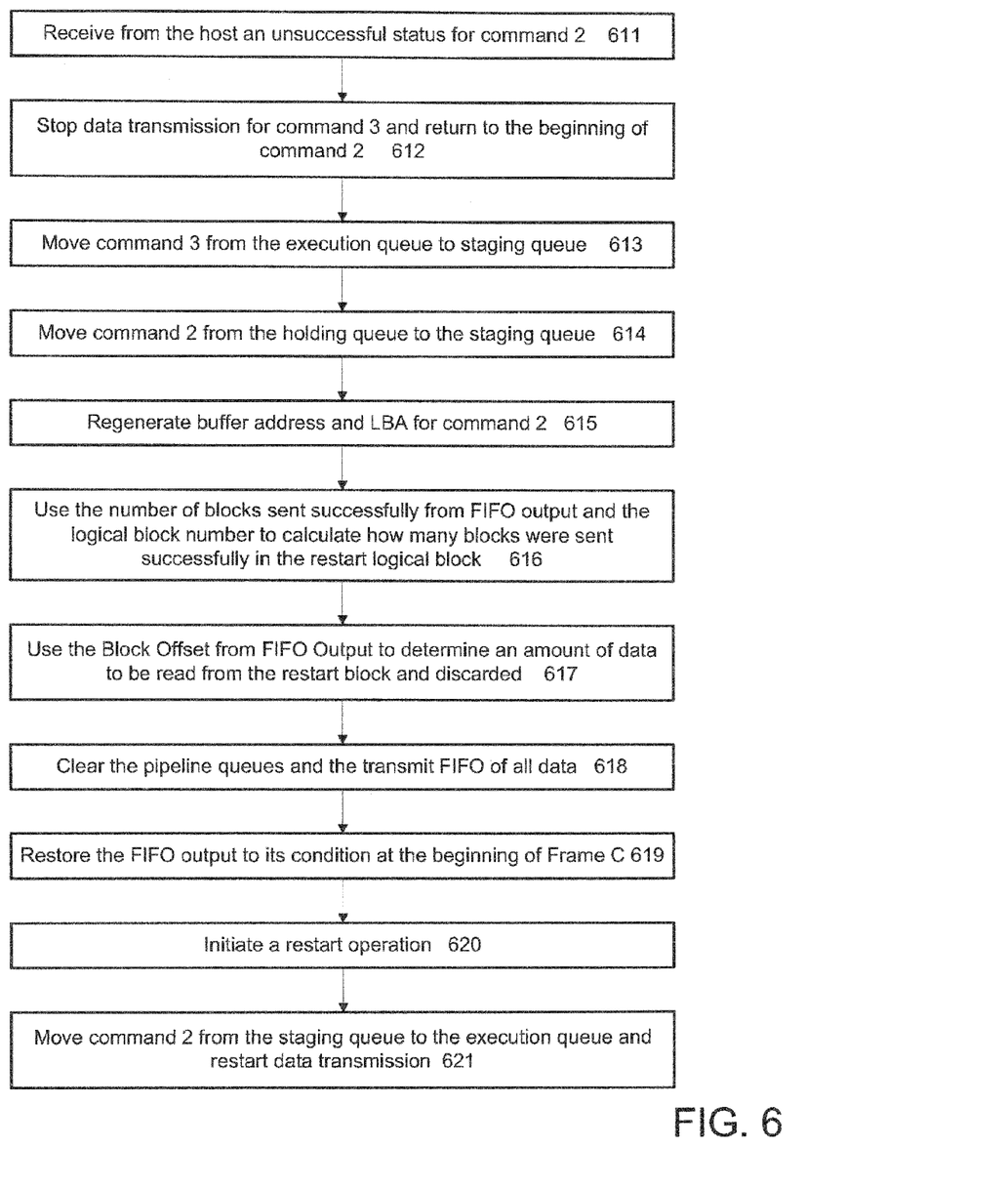
FIG. 6 is a flow diagram illustrating the command queuing restart operation in further detail using the example shown in FIG. 3.

FIG. 6 is a flow diagram illustrating the command queuing restart operation in further detail using the example shown in FIG. 3. The process may follow 411 of FIG. 4, wherein command 1 received a successful status and was moved to the out box 304; all data for command 2 was sent to the transmit FIFO 307 and command 2 was moved to the holding queue; command 3 initiated a request for data transfer and was moved to the execution queue; and command 4 percolated to the front of the staging queue.

At 611, while data requested by command 3 are being sent to the transmit FIFO 307, the firmware may receive from the host an unsuccessful status for command 2. For example, Frame C shown in FIG. 1 may have a transmission error. For this example, assume that command 2 has a logical block to block ratio of 3, and that the $3^{rd}$ block in each of the logical blocks contains two words of padding. Since Frames A hand B have been transmitted successfully, blocks 1 through 5 have been received by the host, and the beginning part of block 6 may have been received successfully too. But the remaining part of block 6, and blocks 7 and 8, may have a transmission error.

Steps 612 through 621 may initialize the hardware for a restart.

At 612, data transmission for command 3 may stop and the operation may return to the beginning of command 2. The content of the staging queue may be pushed down by the number of commands in the execution queue and the holding queue. In this example, the content of the staging queue may be pushed down by two entries (for commands 3 and 2), pushing command 4 from the front of staging queue to the third entry from the front.

At 613, command 3 in the execution queue may be moved from back to the staging queue as the second entry from the front of the queue.

At 614, command 2 in the holding queue may be moved to the staging queue as the front entry, together with its starting buffer address, starting LBA, Skip LBA and number of blocks to transfer saved in the holding queue.

At 615, the buffer address and LBA for command 2 may be regenerated according to equations (1) and (2) and then adjusted so that the resend can start at the beginning of the logical block. In one embodiment, since the host has indicated that frames A and B were received successfully, the buffer address and LBA may be adjusted for blocks 1 to 5 that were sent successfully, so that they will not be sent again. The number of Blocks Sent Successfully 3084 from FIFO Output (which in this example is 5) may be used to adjust the buffer address, the number blocks to send, and the LBA so that the restart process may always start at the beginning of the logical block in which the error occurred (the restart logical block), even though the restart logical block may contain blocks that were sent successfully also (blocks 4 and 5).

At 616, using the number of Blocks Sent Successfully 3084 from FIFO Output 308, (e.g. 5), together with the Logical Block Number 3081 (i.e., the logical block to block ratio, which in this case is 3), calculate how many blocks were sent successfully in the restart logical block and need to be discarded, but read out for logical block the CRC integrity check. In this example, 2 blocks (blocks 4 and 5) in the restart logical block will be discarded prior to transmission. It can be determined that the block (block 6) immediately following the discarded blocks is the block in which the error occurred and the block where the restart operation will begin transmitting data. This block may be referred to as the restart block from which the restart operation will begin retransmitting the data.

After blocks that were sent successfully from the restart logical block are discarded, but used to compute the logical block CRC, at 617 the Block Offset 3082 from FIFO Output 308 is used to determine an amount of data to be read from the restart block and discarded. Data from block 6 is read out from the beginning to satisfy the data integrity check requirement, but only data in the restart block following Block Offset 3082 is sent to the transmit FIFO 307.

At 618, the pipeline queues and the transmit FIFO 307 may be cleared of data.

At 619, the FIFO output 308 may be restored to its condition at the beginning of Frame C. The values of the Block Offset 3082, the number of Blocks Sent 3083, the number of Blocks Sent Successfully 3084, the number of bytes left to transfer in the Transfer Count 3085, and the Frame Header 3086 may be restored exactly as when Frame C was last built. The number of bytes to transfer in the Transfer Count 3085 may be generated based on the following formula:

((Transfer Count 3085−number of Blocks Sent Successfully 3084)×block size)−Block Offset 3082

The Relative Offset/Parameter value may be generated based on the following formula:

Initial Relative Offset/Parameter+(number of Blocks Sent Successfully 3084)×block size)+Block Offset 3082

At 620, the firmware may initiate a restart operation so that the hardware is instructed to check for the Block Offset 3082, and the number of Blocks Sent Successfully 3084, as opposed to a start operation where such values do not need to be checked.

At 621, command 2 may move from the front of the staging queue to the execution queue and the data transmission process may restart from the beginning of frame C.

A method and system for performing a restart operation with logical blocks in queued commands for a disk drive has been disclosed. The present invention has been described in accordance with the embodiments shown, and there could be variations to the embodiments, and any variations would be within the scope of the present invention. For example, the present invention can be implemented using hardware, software, a computer readable medium containing program instructions, or a combination thereof. Software written according to the present invention may be either stored in some form of computer-readable medium such as memory or CD-ROM, and is may be executed by a processor. Accordingly, many modifications may be made without departing from the scope of the appended claims.

We claim:

1. A method comprising:
reading data from a disk;
storing the data in a buffer, wherein the data in the buffer is arranged in blocks;
receiving a first command to transfer the data from the buffer to a host;
transferring the data to the host;
receiving an unsuccessful status from the host indicating a transmission error occurred for the first command;
identifying a block being transferred when the transmission error occurred; and
re-transferring the data in the identified block from the buffer to the host without re-transferring successfully transferred blocks.

2. The method of claim 1, further comprising:
tabulating a number of successfully sent blocks that are confirmed by the host as successfully received; and
identifying the block being transferred when the transmission error occurred, based, at least in part, on the number of successfully sent blocks.

3. The method of claim 2, wherein:
the data is arranged in logical blocks with each logical block including a plurality of blocks;
the first command specifies a starting logical block address (LBA) and a number of blocks to be transferred; and
the method further comprises, during the transferring of the data to the host, maintaining values for i) a logical block ratio that defines a number of blocks per logical block; and ii) the starting LBA.

4. The method of claim 3, further comprising using i) the logical block ratio and ii) the number of successfully sent blocks to determine a logical block that includes the identified block.

5. The method of claim 4, further comprising using the number of blocks sent successfully and the logical block ratio to calculate how many of the blocks in the determined logical block were sent successfully.

6. The method of claim 1, further comprising:
maintaining, during the transferring of data to the host, a block offset that is initialized to an amount of data in a block;
decrementing the block offset, during the transfer of data, by an amount of data transferred; and
using the block offset to determine an amount of the data successfully sent in the identified block.

7. The method of claim 6, further comprising discarding the data from a beginning of the identified block up to the block offset prior to re-transferring the identified block.

8. The method of claim 1, wherein re-transferring the data in the identified block comprises adjusting a starting block address of the first command based on a number of successfully sent blocks and re-executing the first command with the adjusted starting block address.

9. The method of claim 1, wherein:
the data is arranged in logical blocks with each logical block including a plurality of blocks; and
the first command specifies a starting logical block address (LBA) and a number of blocks to be transferred;
the method further comprising:
adjusting the starting LBA of the first command to a beginning of a logical block that includes the identified block;
computing a logical block cyclic redundancy check (CRC) for the logical block that includes the identified block.

10. The method of claim 1, wherein:
the first command is stored in a holding queue during the transferring of the data; and
the method further comprises re-transferring the identified block by storing the first command with an adjusted starting block in a staging queue that stores commands that have not yet been executed.

11. The method of claim 10, wherein:
a second command is stored in an execution queue during the transferring of the data; and
further wherein storing the first command in the staging queue comprises:
pushing commands stored in the staging queue down by a number of commands in the execution queue and the holding queue, and
writing the first command and the second command to the staging queue.

12. The method of claim 11, further comprising writing a starting buffer address of the first command, a starting block of the first command, and a number of blocks to transfer of the first command to the staging queue.

13. The method of claim 1, further comprising setting a restart condition that enables the host to differentiate the re-transferring of the identified block from other operations.

14. A system, comprising:
a memory comprising a plurality of queues configured to queue a series of commands, including a first command and a second command, that transfer data to a host;
a buffer configured to store data read from a disk;

a transmit first in first out memory (FIFO) configured to transmit the data from the buffer to the host; and a disk controller configured to, in response to receiving an unsuccessful status from the host that indicates that a transmission error occurred during transfer of data specified by the first command:
- identify a block of data being transmitted when the transmission error occurred; and
- re-transfer the data in the identified block from the buffer to the host without re-transferring data that was successfully transmitted to the host.

15. The system of claim 14, wherein:

the transmit FIFO includes a FIFO output configured to tabulate, during transferring of data, a number of successfully sent blocks confirmed by the host as successfully received; and the disk controller is configured to identify the block based, at least in part, on the number of successfully sent blocks.

16. The system of claim 15, wherein:

the data is arranged as logical blocks and each logical block includes a plurality of blocks, and further wherein the commands specify i) a starting logical block address (LBA) and ii) a number of blocks to be transferred;

the FIFO output is configured to maintain, during the transferring of the data to the host, a logical block ratio that defines a number of blocks per logical block; and the disk controller is configured to use the logical block ratio and the number of successfully sent blocks to determine a logical block in which the transmission error occurred.

17. The system of claim 14, further comprising:

a staging queue that stores commands that have not yet been executed;

a holding queue configured to store the first command during the transferring of data specified by the first command; and an execution queue configured to store the second command during the transferring of the data specified by the first command; and wherein, in response to receiving the unsuccessful status, the disk controller is configured to store, in the staging queue, the first command with the identified block as a starting block.

18. The system of claim 17, wherein the disk controller is configured to store the first command in the staging queue by:

pushing commands stored in the staging queue down by a number of the commands in the execution queue and the holding queue; and writing the first command and the second command to the staging queue.

19. The system of claim 18 wherein the disk controller is configured to retrieve from the holding queue and to write to the staging queue: i) a starting buffer address for the first command, ii) a starting logical block address of the first command, and iii) the number of blocks to transfer.

20. A method comprising:

moving, from a staging queue to an execution queue, a first command to transfer data arranged in blocks to a host, where the first command specifies a starting block and a number of blocks to be transferred;

fetching data specified by the first command;

moving the first command to a holding queue;

transferring the data to the host;

receiving an error message from the host indicating that an error occurred during the transferring of data;

identifying a block being transferred when the error occurred;

modifying the starting block of the first command to correspond to the identified block to create a modified first command; and moving the modified first command to the staging queue.

* * * * *